Figure 1:
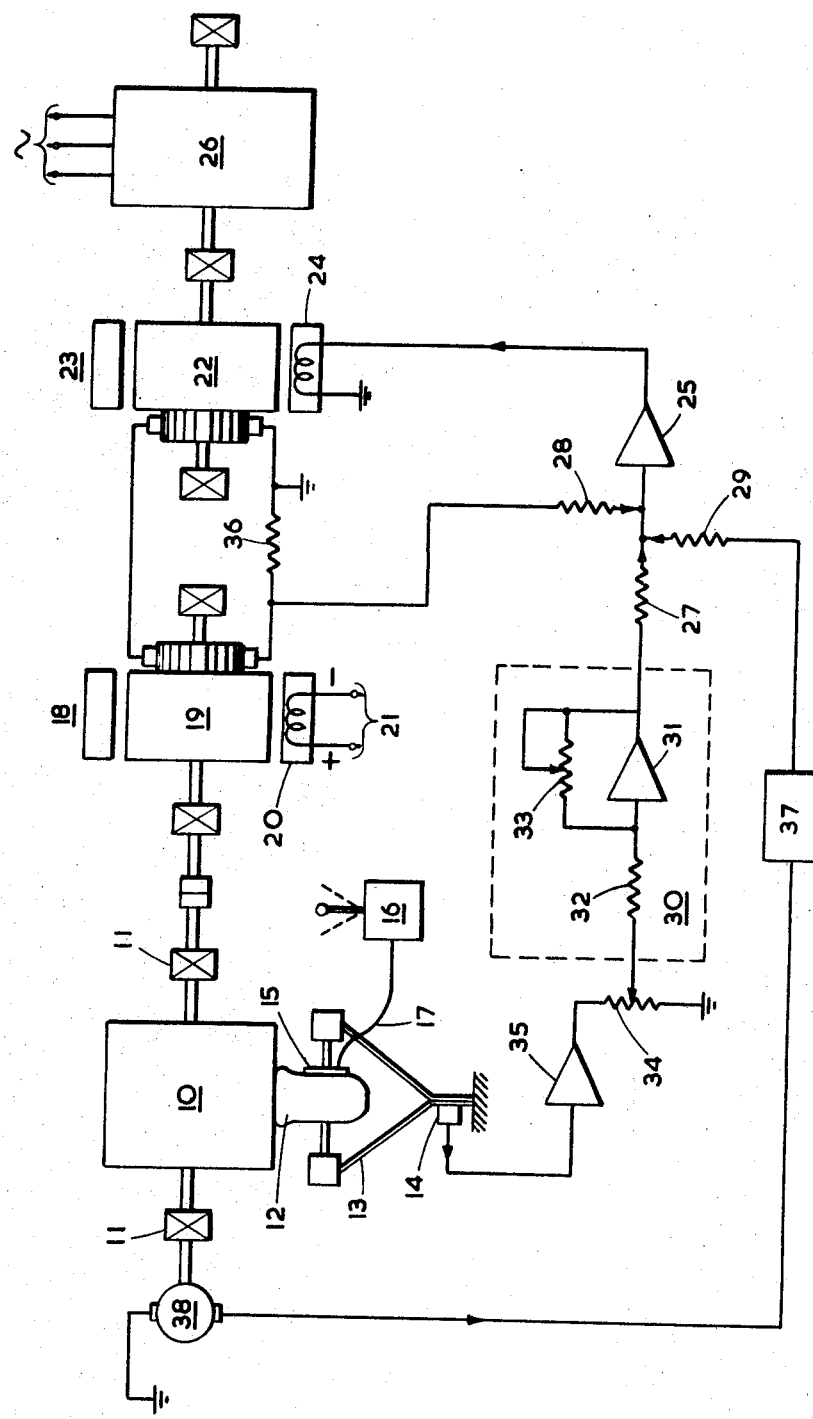

United States Patent [19]
Gunnell et al.

[15] 3,722,269
[45] Mar. 27, 1973

[54] TIRE AND BRAKE TEST DEVICE

[75] Inventors: Geoffrey Herbert Arthur Gunnell; Frank Derek Shaw, both of Stoke-on-Trent, England

[73] Assignee: The English Electric Company Limited, London, England

[22] Filed: March 16, 1970

[21] Appl. No.: 19,830

[30] Foreign Application Priority Data

March 14, 1969 Great Britain..........13,637/69

[52] U.S. Cl......................73/146, 73/126, 73/136 C
[51] Int. Cl.................................................G01l 5/28
[58] Field of Search........73/146, 117, 123, 126, 8, 9, 73/136 C, 136

[56] References Cited

UNITED STATES PATENTS 1,967,139   7/1934   Wilson....................73/136 X

OTHER PUBLICATIONS

Knudsen, R. F., Inertia–Electronically, from ISA Journal, Apr. 1958, Vol. 5, No. 4, pp. 52–54.

*Primary Examiner*—Jerry W. Myracle
*Attorney*—Misegades & Douglas, Keith Misegades and George R. Douglas, Jr.

[57] ABSTRACT

A machine for testing the performance of tires and brakes has a drum 10 against which presses a tired-wheel 12, the drum being coupled to a D.C. electric machine 18, and the tired wheel having a brake 15 for varying the tractive effort applied by the wheel to the drum. Control apparatus for the electric machine varies the torque applied to the drum by the electric machine in dependence upon the tractive effort applied to the drum by the brake so that the apparent inertia of the drum and associated mechanical parts is, as desired, smaller than, equal to, or greater than the true inertia according to the setting of the control apparatus. A test starts with the drum rotating at a predetermined speed, and the brake is then applied so as to cause energy to be transmitted to the brake from the drum via the tire.

The machine may also be used for testing internal combustion engines and clutches.

Similar control arrangements may also be applied to friction welding machines, and to other machines in which the stored energy of one member is to be transmitted frictionally to another member, the stored energy being thereby controllable at values less than, equal to, or greater than the actual value.

16 Claims, 4 Drawing Figures

TIRE AND BRAKE TEST DEVICE

This invention relates to machines which have first and second members which engage one another frictionally in such a manner that movement of one member tends to cause a corresponding movement of the other member by virtue of frictional forces which act between frictionally engaging parts of the two members, and to control apparatus for controlling such machines.

Examples of such machines include
a. machines for testing tires and brakes for land vehicles and aircraft, and for testing internal combustion engine drives and clutches therefor, and
b. machines for welding workpieces together by friction welding.

In such machines it is important to be able to vary over a considerable range of values the effective mass or inertia of one of the members and its associated mechanical parts so that the stored energy of that member and associated parts may be varied over a wide range for a given range of speeds of that member. In operation the whole or some desired part of that stored energy is transferred as required to the other member through the frictionally-engaging parts of those members.

In testing machines as referred to above it is moreover important to be able to simulate the mass, and hence stored energy at a given speed, of a mechanical system in which the tire, brake, engine or clutch will be used in practice, and furthermore to simulate them in conditions which closely approximate to those which the tire, brake etc. will experience in normal operation.

Such a testing machine may comprise a rotatable drum against the cylindrical surface of which is placed under known loading a tired wheel (that is a wheel carrying a resilient tire), the drum being provided with driving means for rotating the drum at a speed at which a test is to be carried out, and the tired wheel being provided with means for varying the tractive force or effort applied by the tired wheel to the drum surface.

The means for varying the tractive force or effort may comprise according to the nature of the test to be performed a brake for applying a braking effort to the tired wheel whereby to decelerate the tired wheel and drum to rest; or it may comprise a clutch and internal combustion engine for applying as desired accelerating or decelerating tractive forces to the drum.

For the purpose of testing tires and brakes the means for varying the tractive force or effort applied to the drum surface commonly takes the first-mentioned form, the tire under test constituting in the case of a tire test the tire carried on the said tired wheel; and the brake under test constituting in the case of a brake test the said brake for braking the said tired wheel.

In a typical tire test for testing the suitability of a given tire to a particular duty (for example on a particular aircraft having a particular mass and take-off and landing speeds) the tire is fitted on the said wheel; the tired wheel is then loaded against the drum surface to simulate the loading experienced in practice; and the drum is run up to the test speed by the driving means. A brake (of known ample performance for the test) is then applied in a desired manner to decelerate the tired wheel and hence the drum to the rest condition, no power being supplied by the driving means while the brake is applied. Measurements of various parameters are taken or recorded during the test to enable subsequent analysis of the performance of the tire.

In a typical brake test the same or a similar procedure is followed, but in this case the tired wheel carries a tire of known performance suitable for testing the brake under test. Again measurements of various parameters (including for example brake temperature) are taken or recorded for enabling subsequent analysis of the brake performance.

In such testing machines the range of tires, brakes, engines and clutches that can be satisfactorily tested on one machine is dependent on the available range of variation of the inertia of the test drum and its associated driving and other mechanical parts.

In earlier proposals for such testing machines the inertia of the test drum and associated driving and other mechanical parts has been varied by providing detachable parts (such as discs) which may be added to or be removed from the test drum. However, with the present day sizes and loadings of the devices to be tested the use of such detachable parts results in a large and cumbersome testing machine which is difficult and time-consuming to handle and adjust. Furthermore, the present day tire loading of the test drum necessitates a drum construction which results in an inherent inertia which is substantially greater than the minimum inertia required for testing.

In a friction type welding machine the parts (or workpieces) to be welded together are carried on opposed members of the machine, one member of the machine being stationary and the other member being rotatable. To carry out the making of a weld the rotatable member is accelerated up to a high speed at which the stored energy of the rotating parts is of a value known to be suitable for effecting the desired welding between the workpieces. The stationary and rotatable members of the machine are then caused to approach one another so that the workpieces are pressed into contact with one another. The resulting frictional forces cause energy to be absorbed from the decelerating rotating member and to be converted into thermal energy for raising the temperature of the workpieces. Subsequently, when the workpieces are both at rest they are subjected to a predetermined axial pressure so that the metals of the two workpieces fuse intimately together to form the desired weld.

The suitability of the machine for carrying out a wide range of operations depends upon the ability to operate the rotatable member of the machine over a wide range of different speeds and a wide range of stored energies. The ability to vary the inertia of the rotatable member over a wide range of values is thus important.

According to the present invention a machine having
a. first and second members having parts which engage one another frictionally in such a manner that movement of one member tends to cause a corresponding movement of the other member by virtue of frictional forces which act between frictionally engaging parts of the two members,
b. driving means connected with the first member and capable of at least driving the first member,
c. means connected with the second member for varying a tractive force transmitted frictionally between the first and second members whereby to induce changes in the speed of the first member, and d. control apparatus for controlling the driving means, characterized in that the control apparatus includes means connected with at least one of the said members for producing a control signal dependent upon the tractive force transmitted frictionally between the first and second members, and torque control means responsive to the tractive force dependent control signal and effective to vary the torque of the driving means in response thereto in a manner such as to maintain the energy transmitted by the frictional engagement of the first and second members during a given speed change as a predetermined function of the change in stored energy of the first member, the driving means and associated mechanical parts during the said speed change, the 'apparent inertia' of the first member, the driving means and associated mechanical parts being thereby maintained as a predetermined function of the true inertia thereof.

According to one preferred feature of the present invention the control apparatus includes means connected with at least one of the said members for producing a control signal dependent upon the tractive force transmitted frictionally between the first and second members, and torque control means responsive to the tractive force dependent control signal and effective to vary the torque of the driving means in response thereto in a manner such as to maintain at a desired value the ratio of the rate of change of energy supplied or absorbed by the driving means to the rate of transmission of energy between the first and second members by frictional engagement thereof, the 'apparent inertia' of the first member, the driving means and associated mechanical parts being thereby maintained in predetermined ratio to the true inertia thereof.

According to another preferred feature of the present invention the torque control means includes 'apparent inertia' adjustment means for varying the response of the torque control means to the tractive force dependent control signal whereby to vary the said desired value at which the said ratio is to be maintained, and hence to vary the said 'apparent inertia' within a range of values extending above and below the said true inertia.

According to another preferred feature of the present invention the machine includes support means for at least one of the said first and second members, and the said means for producing the tractive force dependent control signal comprises strain-sensing means connected with the support means for sensing the strain thereof resulting from the tractive force transmitted between the first and second members and for providing as the tractive force dependent control signal a signal dependent on the said strain.

According to another preferred feature of the present invention the torque control means includes an error-actuated closed loop torque control means responsive differentially to torque reference and feedback signals and effective to maintain the torque of the driving means at a value determined by the torque reference signal, and means are provided for supplying as the torque feedback signal a signal representative of the torque of the driving means, and as the torque reference signal the said tractive force control signal.

According to another preferred feature of the present invention means for producing a speed dependent signal representative of the speed of the first member are provided, and the torque control means includes stall-protection means responsive to the speed dependent signal and effective to cause the torque control means to reduce to a low value the torque of the driving means whenever the speed of the first member falls below a predetermined low value, whereby to prevent the driving means exerting a high torque on the first member when the first and second members are in the stalled condition.

According to another preferred feature of the present invention means for producing a speed dependent signal representative of the speed of the first member are provided, and the torque control means includes loss-compensating means responsive to the speed dependent signal and effective to cause the torque control means to vary the torque of the driving means in a manner compensating for windage and friction losses associated with the first member, the driving means and associated mechanical parts.

The driving means preferably comprises a dynamoelectric machine.

Though the present invention may be applied to any machine in which energy is to be transmitted frictionally between first and second members in the manner mentioned above and in which the effective inertia of the first member is to be variable at will above and below its actual value, the present invention will now be discussed specifically in relation to a machine for testing brakes.

Figure 2:
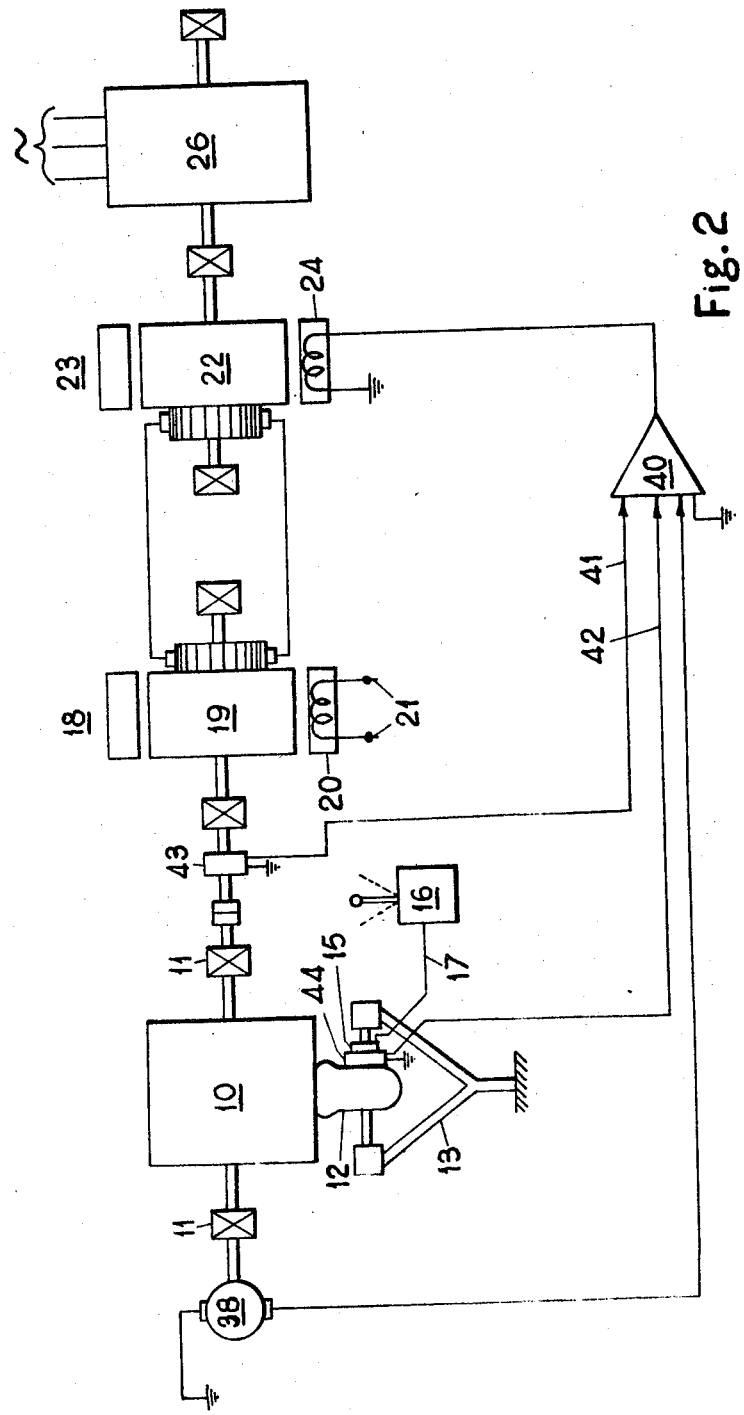
Figure 3:
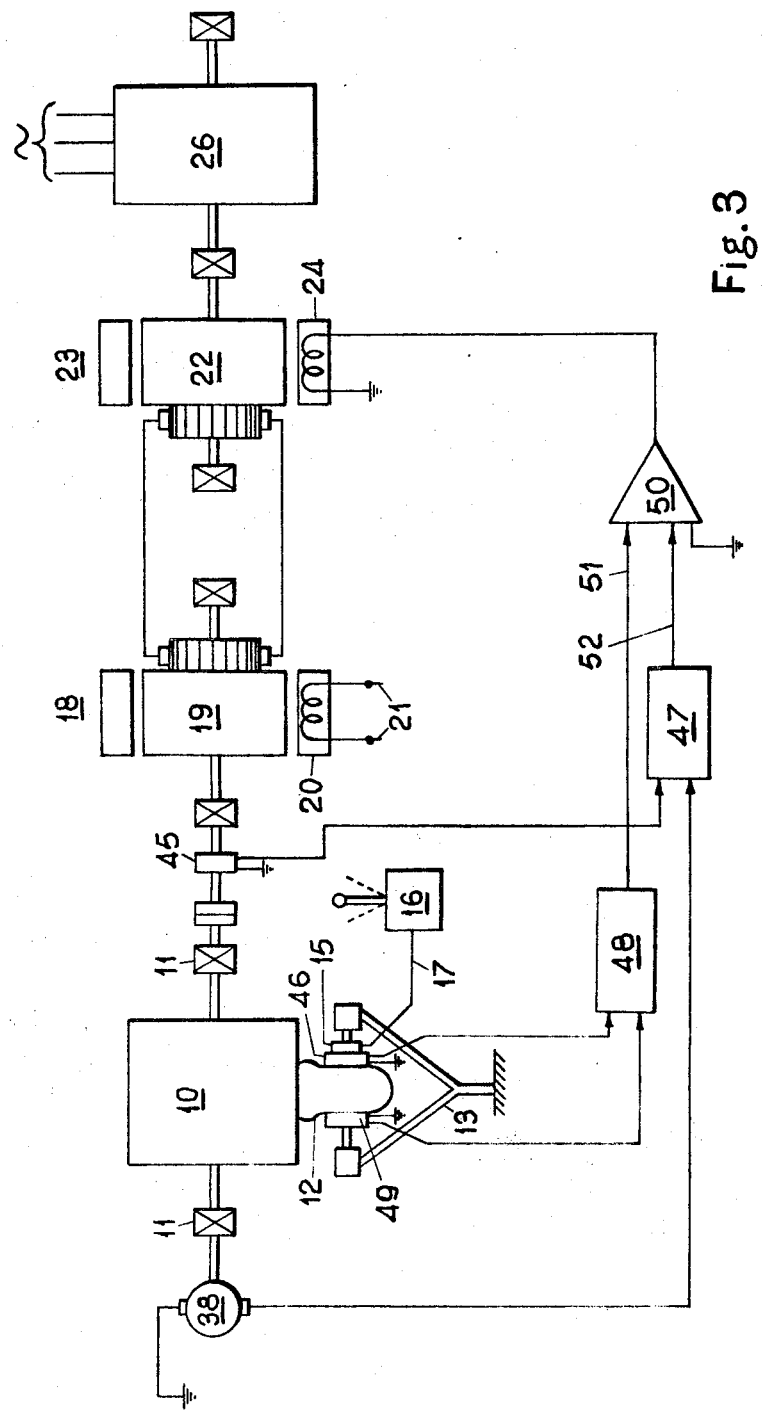
Figure 4:
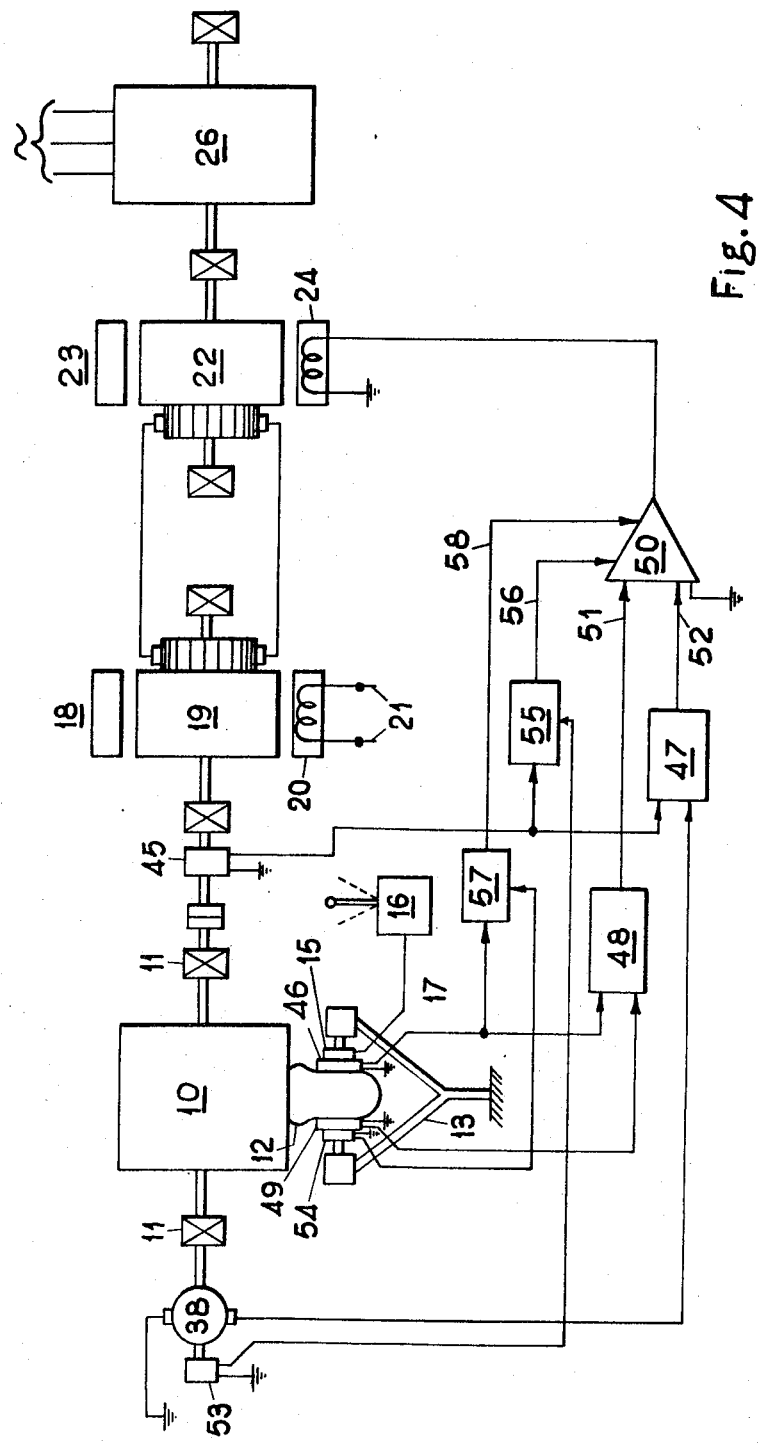

One brake testing machine embodying the present invention will now be described with reference to the accompanying drawings in which FIG. 1 shows schematically the associated mechanical and electrical systems of the machine, and FIGS. 2 to 4 show modified forms of the machine shown in FIG. 1.

Referring now to FIG. 1 of the drawing the apparatus includes a drum 10 of suitably strong construction mounted in bearings 11 for rotation, and a rubber-tired wheel 12 which bears against the cylindrical surface of the drum and which is rotatably mounted in a fixed supporting structure 13. This structure incorporates means not shown for varying the radial separation of the wheel and drum whereby to vary the loading of the tire as desired, and a strain gauge device 14 for providing an electrical signal dependent upon the deflection of the structure, and hence upon the retarding force exerted by the wheel on the drum.

The wheel is provided with a mounting to accommodate the brake assembly 15 under test, and brake control means 16 supplies fluid under pressure through connection 17 to the brake so as to control the braking effort applied to the wheel 12.

A direct current electrical machine 18 has its armature 19 coupled to the drum 10. The field system 20 of this machine is supplied with constant current from a supply source 21, and its armature circuit is supplied with direct current by the armature 22 of a second D.C. machine 23 whose field system 24 is supplied with a controlled direct current by a power amplifier 25.

The D.C. machine 23 is driven at constant speed by an A.C. driving motor 26.

The input circuit of the amplifier 25 is supplied with a torque reference current signal through circuit 27, a torque reset current signal through circuit 28, and a loss compensating current signal through circuit 29.

The torque reference current signal is derived from an operational amplifier 30 which comprises a high gain amplifier 31, a high input series impedance 32 and an adjustable parallel impedance 33.

The input signal for the operational amplifier 30 is derived from a potentiometer 34 which is fed with a brake effort dependent signal by a power amplifier 35 which is in turn fed with the output signal of the strain gauge device 14.

The torque reset current signal is derived from a shunt 36 connected in series with the two armature circuits 19 and 22, since the torque of the machine 18 coupled with the drum is dependent solely on the armature current, the field strength of the machine 18 being fixed. The loss compensating current signal is derived from a function generator 37 which is supplied with a drum speed dependent signal by a tachogenerator 38 coupled to the drum.

In operation, the strain gauge device 14 and amplifier 35 produce at the output tapping of the potentiometer 34 a signal dependent on the effort exerted by the brake wheel 12 on the drum 10. This signal will be referred to hereafter as the 'brake effort signal.'

The operational amplifier 30 will provide at the output thereof a current signal whose magnitude is dependent on the product of the brake effort signal and the gain '$K$' of the operational amplifier 30. This gain '$K$' can be varied, for example, by adjusting the parallel impedance 33, and both positive and negative values can be achieved. Thus the torque reference signal supplied to the reference circuit 27 of the amplifier 25 is proportional to the product of '$K$' and the brake effort signal.

The amplifier 25 and torque reset circuit 28 act therefore to control the torque exerted on the drum by the machine 18 at a value proportional to the product ($K \times$ brake effort).

When '$K$' is positive the machine 18 acts as a motor driving the drum, whereas when '$K$' is negative the machine 18 acts as a generator driven by the drum. In the first case the machine 18 effectively increases the energy to be absorbed by the brake in decelerating the drum, whilst in the second case the machine 18 effectively decreases the energy to be absorbed by the brake in decelerating the drum.

It can be shown that if the inertia of the drum and associated mechanical system is $I_D$, then with the electrical machine 18 operative the "apparent or effective inertia" of the drum and associated mechanical system is proportional to $I_D \times [R_D/(R_D - K)]$ where $R_D$ is the radius of the drum surface. In other words the mechanical inertia of the drum and mechanical system is multiplied by a factor $[1/1 - (K)/(R_D)]$.

Thus for a given mass to be decelerated by the brake in actual real-life duty, the brake test rig operator can determine the value of '$K$' to use for simulating the intended brake duty on the test apparatus.

Friction and windage losses are compensated for by adjusting the input to the power amplifier 25 by means of the output signal of the function generator 37. This generator may for example produce an output signal which is the square of its input signal.

With this system the $I^2R$ losses in the machine 18 do not affect the operation of the apparatus, so that these losses are not compensated for.

Means not shown are provided to reduce the torque reference signal to a low or zero value when the drum speed has fallen to a low or zero value. This is to prevent the machine 18 being caused to produce a large torque when the drum has been brought to rest, since this would otherwise occur because the brake effort signal would remain unchanged when the drum has become stationary; that is, because the structure 13 remains in its stressed state after the drum has been arrested until the brake is subsequently released.

The loss compensating signal may be used, as an alternative, to vary the value of '$K$' of the operational amplifier 30.

Any other equivalent closed loop torque controlled motor system which is capable of exerting positive and negative torques on the drum may be used in place of that described.

Though in the system described above the torque of the dynamo-electric machine 18 has been controlled in accordance with the brake effort signal provided by the strain gauge 14, any other means may be provided for supplying an equivalent control signal which is indicative of the rate of transmission of energy to the tired wheel 12 by the drum 10.

Similarly though the dynamo-electric machine 18 has been controlled by varying the torque whereby to control the rate of supply or absorption of energy by the dynamo-electric machine 18 to or from the drum 10, any other suitable means for controlling that rate of supply or absorption of energy may be employed.

The machine can also be used for testing tires by substituting in place of the tire of known ample performance a tire under test, and in place of the brake under test a brake of known ample performance.

Furthermore the machine can also be used for testing an internal combustion engine drive by coupling such a drive under test to the tired wheel 12. Likewise a clutch may be tested by including a clutch under test in a suitable internal combustion engine drive coupled to the tired wheel 12.

In a modified form of the above described testing machine as shown in FIG. 2 the torque of the dynamo-electric machine 18 is controlled instead by the output of an amplifier 40 which responds to two signals supplied at input circuits 41, 42 and adjusts the dynamo-electric machine torque in a manner such as to keep the ratio of the two signals constant at a desired value. The two signals are derived respectively from two torque-meters 43, 44 which are mounted respectively between the dynamo-electric machine 18 and the drum 10, and between the tired wheel 12 and the associated brake assembly 15, so as to provide torque signals indicative of the torques of the machine 18 and the wheel 12.

In another modified form of the first described testing machine as shown in FIG. 3 two torque-meters 45, 46 mounted respectively between the dynamo-electric machine 18 and the drum 10, and between the tired wheel 12 and the associated brake assembly 15 provide dynamo-electric machine torque and brake torque signals respectively. These torque signals are combined in multipliers 47, 48 in known manner with corresponding speed signals derived from tacho-generators 38, 49 and dependent respectively on the speeds of the dynamo-electric machine 18 and the tired wheel 12 to provide horsepower signals dependent respectively on the rate at which energy is supplied to or absorbed from the drum by the machine 18 and on the rate at which energy is absorbed by the brake. This last-mentioned rate is dependent on the rate at which energy is transmitted from the drum to the tired wheel. An amplifier 50 responds to the two horsepower signals supplied at input circuits 51, 52 to control the torque of the dynamo-electric machine 18 in a manner such as to maintain the ratio of the two horsepower signals at a desired value.

In a modification of this second modified form of testing machine as shown in FIG. 4 means 53, 54 are also provided for emitting electric signals indicative of equal increments of rotation of the drum, and of the tired wheel respectively. The electric machine torque signals derived from torque meter 45 are integrated in device 55 for successive increments of rotation of the drum to provide amplifier control circuit 56 an energy signal dependent on the energy supplied to or absorbed from the drum by the machine 18. Likewise, the brake torque signals are integrated in device 57 for successive increments of rotation of the tired wheel 12 to provide at amplifier control circuit 58 an energy signal dependent on the energy absorbed by the brake and hence on the energy transmitted to the wheel 12 by the drum 10. The two energy signals are employed, alone or in combination, to modify the desired value at which the said ratio is maintained in a manner such that the energy absorbed by the brake reaches a desired value by the end of the test.

This method of controlling the total energy absorbed by the brake may also be applied to the machine described with reference to the FIG. 1, by causing, for example, the gain of the amplifier 31 to vary in dependence on the amount of energy that the brake has yet to absorb before a test is complete.

We claim:

1. A machine having
   a. first and second members having parts which engage one another frictionally in such a manner that movement of one member tends to cause a corresponding movement of the other member by virtue of frictional forces which act between frictionally engaging parts of the two members,
   b. driving means connected with the first member and capable of at least driving the first member,
   c. means connected with the second member for varying a tractive force transmitted frictionally between the first and second members whereby to induce changes in the speed of the first member, and
   d. control apparatus for controlling the driving means, characterized in that
      the control apparatus includes means connected with at least one of the said members for producing a control signal dependent upon the tractive force transmitted frictionally between the first and second members, and torque control means responsive to the tractive force dependent control signal and effective to vary the torque of the driving means in response thereto in a manner such as to maintain the energy transmitted by the frictional engagement of the first and second members during a given speed change as a predetermined function of the change in stored energy of the first member, the driving means and associated mechanical parts during the said speed change, the 'apparent inertia' of the first member, the driving means and associated mechanical parts being thereby maintained as a predetermined function of the true inertia thereof.

2. A machine having
   a. first and second members having parts which engage one another frictionally in such a manner that movement of one member tends to cause a corresponding movement of the other member by virtue of frictional forces which act between frictionally engaging parts of the two members,
   b. driving means connected with the first member and capable of at least driving the first member,
   c. means connected with the second member for varying a tractive force transmitted frictionally between the first and second members whereby to induce changes in the speed of the first member, and
   d. control apparatus for controlling the driving means, characterized in that
      the control apparatus includes means connected with at least one of the said members for producing a control signal dependent upon the tractive force transmitted frictionally between the first and second members, and torque control means responsive to the tractive force dependent control signal and effective to vary the torque of the driving means in response thereto in a manner such as to maintain at a desired value the ratio of the rate of change of energy supplied or absorbed by the driving means to the rate of transmission of energy between the first and second members by frictional engagement thereof, the 'apparent inertia' of the first member, the driving means and associated mechanical parts being thereby maintained in predetermined ratio to the true inertia thereof.

3. A machine according to claim 2,
   wherein the torque control means includes 'apparent inertia' adjustment means for varying the response of the torque control means to the tractive force dependent control signal whereby to vary the said desired value at which the said ratio is to be maintained, and hence to vary the said 'apparent inertia' within a range of values extending above and below the said true inertia.

4. A machine according to claim 2,
   including support means for at least one of the said first and second members, and
   wherein the said means for producing the tractive force dependent control signal comprises strain-sensing means connected with the support means for sensing the strain thereof resulting from the tractive force transmitted between the first and second members and for providing as the tractive force dependent control signal a signal dependent on the said strain.

5. A machine according to claim 4, including means for producing a speed dependent signal representative of the speed of the first member, and wherein the torque control means includes stall-protection means responsive to the speed dependent signal and effective to cause the torque control means to reduce to a low value the torque of the driving means whenever the speed of the first member falls below a predetermined low value, whereby to prevent the driving means exerting a high torque on the first member when the first and second members are in the stalled condition.

6. A machine according to claim 4, including means for producing a speed dependent signal representative of the speed of the first member, and wherein the torque control means includes loss-compensating means responsive to the speed dependent signal and effective to cause the torque control means to vary the torque of the driving means in a manner compensating for windage and friction losses associated with the first member, the driving means and associated mechanical parts.

7. A machine according to claim 4, wherein the torque control means includes 'apparent inertia' adjustment means for varying the response of the torque control means to the tractive force dependent control signal whereby to vary the said desired value at which the said ratio is to be maintained, and hence to vary the said 'apparent inertia' within a range of values extending above and below the said true inertia.

8. A machine according to claim 4, wherein the torque control means includes an error-actuated closed loop torque control means responsive differentially to torque reference and feedback signals and effective to maintain the torque of the driving means at a value determined by the torque reference signal, and including means for supplying as the torque feedback signal a signal representative of the torque of the driving means, and means for supplying as the torque reference signal the said tractive force dependent control signal.

9. A machine according to claim 2, wherein the torque control means includes an error-actuated closed loop torque control means responsive differentially to torque reference and feedback signals and effective to maintain the torque of the driving means at a value determined by the torque reference signal, and including means for supplying as the torque feedback signal a signal representative of the torque of the driving means, and means for supplying as the torque reference signal the said tractive force dependent control signal.

10. A machine according to claim 2, characterized in that the torque control means controls the torque of the driving means to maintain it in predetermined relationship to the tractive force dependent control signal.

11. A machine according to claim 10, wherein the torque control means includes 'apparent inertia' adjustment means for varying the response of the torque control means to the tractive force dependent control signal whereby to vary the said desired value at which the said ratio is to be maintained, and hence to vary the said 'apparent inertia' within a range of values extending above and below the said true inertia.

12. A machine according to claim 10, including support means for at least one of the said first and second members, and wherein the said means for producing the tractive force dependent control signal comprises strain-sensing means connected with the support means for sensing the strain thereof resulting from the tractive force transmitted between the first and second members and for providing as the tractive force dependent control signal a signal dependent on the said strain.

13. A machine according to claim 10, wherein the torque control means includes an error-actuated closed loop torque control means responsive differentially to torque reference and feedback signals and effective to maintain the torque of the driving means at a value determined by the torque reference signal, and including means for supplying as the torque feedback signal a signal representative of the torque of the driving means, and means for supplying as the torque reference signal the said tractive force dependent control signal.

14. A machine according to claim 10, wherein the means for producing the tractive force dependent control signal comprises means connected with the second member for producing a torque signal dependent on the torque exerted on the second member by the said means connected with the second member.

15. A machine according to claim 10, including first torque signal producing means connected with the first member for producing a first torque signal dependent on the torque exerted on the first member by the driving means, and second torque signal producing means connected to the second member for producing as the tractive force dependent control signal a second torque signal dependent on the torque exerted on the second member by the said means connected with the second member, and wherein the torque control means responds to the first and second torque signals and varies the torque of the driving means in a sense such as to maintain the first and second torque signals in predetermined relationship.

16. A machine according to claim 2, wherein the control apparatus includes first horsepower signal producing means connected with the first member for producing a first horsepower signal dependent on the horsepower transmitted between the first member and the driving means, and second horsepower signal producing means connected with the second member for producing a second horsepower signal dependent on the horsepower transmitted between the second member and the said means connected with the second member, and wherein the torque control means responds to the first and second horsepower signals and varies the torque of the driving means in a sense tending to maintain the first and second horsepower signals in predetermined relationship.

* * * * *